March 8, 1932.  J. E. GLEASON  1,848,342

GEAR

Filed May 22, 1929

INVENTOR
JAMES E. GLEASON
BY
ATTORNEY

Patented Mar. 8, 1932

1,848,342

UNITED STATES PATENT OFFICE

JAMES E. GLEASON, OF ROCHESTER, NEW YORK, ASSIGNOR TO GLEASON WORKS, OF ROCHESTER, NEW YORK, A CORPORATION OF NEW YORK

GEAR

Application filed May 22, 1929. Serial No. 365,014.

The present invention relates to tapered gears, bevel and hypoid gears, and particularly to double spiral or herringbone tapered gears.

The purpose of the present invention is to provide a form of double-spiral or herringbone tapered gear which will be easy to manufacture and stronger than any prior proposed form of such gears.

With the present invention, the gears are made in two parts and the teeth on the inner portion are inclined at an angle to the teeth on the outer portion to provide, when the two parts are secured together, the double-helical or herringbone tooth. The inner portion is made with fewer teeth than the outer portion, that is, the inner portion will have a coarser pitch than the outer portion. This construction provides tapered gears of greater strength than tapered gears as heretofore manufactured, for with a tapered gear of the usual construction the teeth are of the same pitch throughout their length, and the teeth taper in height and thickness from their outer to their inner ends.

In a pair of gears constructed according to this invention, the outer portions of the two meshing gears will be of the same pitch and the inner portions of the two gears will be of the same pitch but of a different pitch from the outer portions. This means, that the ratio of the teeth on the inner portions of the two meshing gears will be equal to the ratio of the teeth on the outer portions of the two gears. The two portions of each gear are connected together and rotate together as one gear. Preferably, the tooth portions will be longitudinally curved. A very convenient way of manufacturing these gears is to cut the outer and inner portions of each gear as spiral bevel gears of opposite hands.

Figure 1:
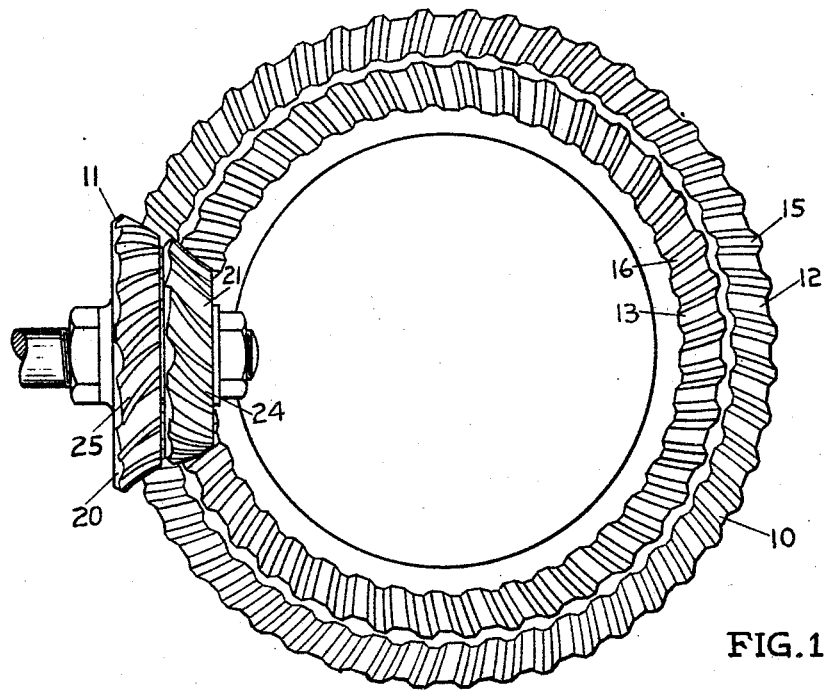
Figure 2:
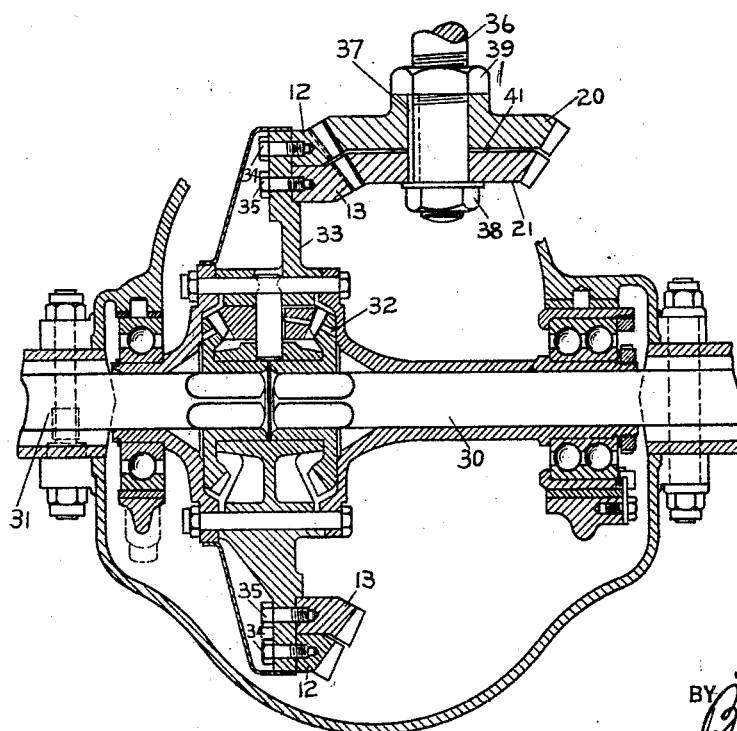

One practical embodiment of the invention is illustrated in the accompanying drawings, in which:

Figure 1 is a side elevation showing a pair of double-helical or herringbone bevel gears constructed according to this invention in mesh; and Figure 2 is a fragmentary sectional view through the rear axle of an automotive vehicle showing an application of the present invention to the rear axle drive of a motor car.

10 designates the gear or larger member of the pair and 11 the pinion. The gear is made in two parts, an outer portion 12 and an inner portion 13. Each portion is toothed and the teeth of the two portions are inclined at an angle to each other to provide, when the two parts are secured together, the double helical or herringbone tooth form. The two portions 12 and 13 have different numbers of teeth. Preferably, the inner portion 13 has fewer teeth than the outer portion, that is, is of coarser pitch than the outer portion. With this construction, the inner portion and, therefore, the whole gear will be stronger than herringbone bevel gears of prior types, in which the pitch, that is, the number of teeth in the inner portion is the same as on the outer portion and in which due to the taper of the teeth, the gear is weaker at its inner than at its outer end. The present invention provides a gear, the inner portion of which is just as strong as the outer portion. Preferably, the teeth of the two portions are longitudinally curved and preferably curved on opposite hands. In the gear shown, the teeth 15 of the tooth portion 12 are of right-hand curvature and the teeth 16 of the inner portion 13 are of left hand curvature.

Like the gear, the pinion 11 is made in two parts, an outer portion 20 and an inner portion 21. The inner portion 21 corresponds in pitch to the inner portion 13 of the gear 10 and is of coarser pitch than the outer portion 20 of the pinion which corresponds in pitch to the pitch of the outer portion 12 of the gear. Thus, the ratio of the inner portions 21 and 13 is the same as the ratio of the outer portions 20 and 12 so that when the inner and outer portions of each gear are secured together they will mesh as one gear with the mating gear of the pair. In the pair shown, the outer member 12 of the gear 10 has 48 teeth and the inner member 13 of this same gear 40 teeth, while the inner member 21 of the pinion 11 has 10 teeth and the outer member 20 of the pinion has 12 teeth.

The teeth 24 of the inner portion 21 of the pinion are curved lengthwise in an opposite direction from the curvature of the teeth 25 of the outer portion 20 of the pinion, that is, are of opposite hand. Of course, the hands of the two portions of the pinion are opposite from the hands of the portions of the gear with which each, respectively, mesh. The inner portion 21 of the pinion has teeth of right hand and the outer portion 25 of the pinion teeth are left hand. This particular combination is preferred for forward drives as the inner portion 21 of the pinion will then thrust inward and the outer portion 25 outward.

Preferably, the two portions of each gear will be cut as spiral bevel gears with generated tooth profiles. This method of cutting has the advantage of quickness and simplicity and in addition the gears can be cut on existing machinery.

The load carried by the inner and outer portions of the gears can be balanced so that each portion of each gear will carry the same load at any point in the face. This can be done, for instance, by making the spiral angle of the inner portion greater than the spiral angle of the outer portion.

Figure 2 shows the gears of my invention in use in a rear axle drive. The two parts of the rear axle are indicated at 30 and 31, respectively. The usual form of differential connecting the two halves of the axle is designated at 32. The two parts 12 and 13 forming the ring gear are secured to the differential housing 33 by the screws or bolts 34 and 35. The two portions 20 and 21 of the drive pinion are mounted on the propeller shaft 36 in such way as to rotate with the propeller shaft through the key connection indicated at 37. Nuts 38 and 39 which are threaded on the propeller shaft serve to take the thrusts of the two halves of the pinion. A shim 41 of the required size is interposed between the portions 20 and 21.

Aside from the low cost which is a feature of a pair where the two parts of each gear are cut as spiral bevel gears and secured together there is the advantage, not present in any form of herringbone bevels where the two portions are made integral, that by making the gears in two parts, a proper tooth bearing can readily be secured. Thus, the gear and pinion can be mounted on a testing machine in the shop and run together and allowed to adjust themselves until a proper tooth bearing is secured. When the proper tooth bearing is secured, the shim 41 will be selected to a size to retain this tooth bearing when the gears are mounted in the axle and it is also possible to adjust the parts 12 and 13 of the ring gear with reference to each other for the same purpose by interposing a shim under one or other of these parts between the back of the part and the differential housing.

While the invention has been described in connection with a particular embodiment and in connection with a particular use for that embodiment, it will be understood that it is capable of further modification and use and that this application is intended to cover any variations, uses, or adaptations, of the invention, following, in general the principles of the invention and including such departures from the present disclosure as come within known or customary practise in the gear art and as may be applied to the essential features hereinbefore set forth and as fall within the scope of the invention or the limits of the appended claims.

Having thus described my invention, what I claim is:

1. A tapered gear comprising outer and inner members having longitudinally curved teeth, the teeth of one member being differently inclined from the teeth of the other member to a line drawn radially of the apex of the gear, and the inner member having a smaller number of teeth than the outer member.

2. A tapered gear comprising outer and inner members having longitudinally curved teeth of opposite hand, the inner member being of a larger pitch than the outer member and having a larger spiral angle than the outer member.

3. A pair of tapered gears, each of which consists of an outer member and an inner member whose teeth are inclined at different angles to a straight line drawn from the apex of the gear, the number of teeth in the inner member of each gear being less than in the outer member of the same gear but the ratio of teeth in the outer members being the same as in the inner members.

4. A pair of tapered gears, each of which comprises an outer and an inner member whose teeth are longitudinally curved and inclined at different angles to a straight line drawn from the apex of the gear, the inner member of each gear having less teeth than the outer member of the same gear, but the ratios of inner members and outer members being equal.

5. A pair of tapered gears each of which consists of an inner member and an outer member having longitudinally curved teeth of opposite hands, the number of teeth in the inner member of each gear being less than in the outer member of the same gear but the ratios of inner and outer members being equal.

6. A pair of tapered gears, each of which comprises an inner member and an outer member having longitudinally curved teeth, the hands of said members being different and the spiral angles of the teeth of the smaller members being larger than the spiral angles of the teeth of the larger member, said inner members having fewer teeth than their respective outer members, but the ratio of the inner members being equal to the ratio of the outer members.

7. A tapered gear having a toothed portion comprising two sections of different numbers of teeth, the section at the smaller end of the gear having the smaller number of teeth.

8. A tapered gear having its toothed portion formed in two parts, the teeth of the two parts being oppositely inclined to one another and having different numbers of teeth, the part at the small end of the gear having the smaller number of teeth.

9. A tapered gear having its toothed portion formed in two, the teeth on the two being oppositely inclined to one another and having different numbers of teeth, the part at the inner end of the gear having the smaller number of teeth, and the teeth of said inner part being more inclined to a generatrix of the pitch surface of the gear than the teeth of the outer part.

JAMES E. GLEASON.